US008068428B2

(12) United States Patent
Strutt et al.

(10) Patent No.: US 8,068,428 B2
(45) Date of Patent: Nov. 29, 2011

(54) SYSTEM AND METHOD FOR PERFORMING TOPOLOGY CONTROL IN A WIRELESS NETWORK

(75) Inventors: Guenael T. Strutt, Stanford, FL (US); Sebnem Z. Ozer, Altamonte Springs, FL (US); Shyamal Ramachandran, Maitland, FL (US)

(73) Assignee: MeshNetworks, Inc., Maitland, FL (US)

( * ) Notice: Subject to any disclaimer, the term of this patent is extended or adjusted under 35 U.S.C. 154(b) by 909 days.

(21) Appl. No.: 11/269,931

(22) Filed: Nov. 9, 2005

(65) Prior Publication Data
US 2007/0115829 A1    May 24, 2007

(51) Int. Cl.
H04J 3/14 (2006.01)
H04J 1/16 (2006.01)
H04Q 7/24 (2006.01)
(52) U.S. Cl. ......... 370/238; 370/252; 370/338; 455/522
(58) Field of Classification Search .................. 370/238, 370/328, 331–332, 310.2, 349, 335; 455/522
See application file for complete search history.

(56) References Cited

U.S. PATENT DOCUMENTS

| 6,735,448 | B1 | 5/2004 | Krishnamurthy et al. |
| 6,807,165 | B2 | 10/2004 | Belcea |
| 6,873,839 | B2 | 3/2005 | Stanforth |
| 6,907,243 | B1 * | 6/2005 | Patel ........................... 455/442 |
| 6,961,310 | B2 * | 11/2005 | Cain ............................ 370/238 |
| 6,965,568 | B1 * | 11/2005 | Larsen .......................... 370/238 |
| 7,003,311 | B2 * | 2/2006 | Ebata et al. ................... 455/525 |
| 7,072,650 | B2 | 7/2006 | Stanforth |
| 7,158,792 | B1 * | 1/2007 | Cook et al. .................... 455/450 |
| 7,215,928 | B2 * | 5/2007 | Gage et al. .................... 455/63.1 |
| 7,394,826 | B2 * | 7/2008 | Cain et al. ..................... 370/469 |
| 7,480,248 | B2 * | 1/2009 | Duggi et al. ................... 370/238 |
| 7,512,074 | B2 | 3/2009 | Strutt et al. |
| 7,561,526 | B2 * | 7/2009 | Naden et al. .................. 370/238 |
| 2002/0013856 | A1 | 1/2002 | Garcia-Luna-Aceves et al. |
| 2002/0172186 | A1 * | 11/2002 | Larsson ........................ 370/349 |
| 2003/0189906 | A1 * | 10/2003 | Belcea .......................... 370/318 |
| 2004/0022223 | A1 * | 2/2004 | Billhartz ....................... 370/338 |
| 2004/0156345 | A1 * | 8/2004 | Steer et al. .................... 370/338 |

(Continued)

OTHER PUBLICATIONS

Alaa Muqattash, "A Distributed Transmission Power Control Protocol for Mobile Ad Hoc Networks", IEEE Transactions on Mobile Computing, vol. 3, No. 2, Apr.-Jun. 2004, pp. 113-128.

(Continued)

Primary Examiner — Kwang B Yao
Assistant Examiner — Candal Elpenord
(74) Attorney, Agent, or Firm — Randi L. Karpinia

(57) ABSTRACT

A system and method for performing topology control in a wireless network (100). The system and method operate to enable a node (102-1) to determine the link cost of a link between itself and another node (102-2), based on the number of nodes (102, 106, 107) that would be affected by message transmission by the node (102) and the other node (102-2), and the number of nodes (102, 106, 107) that would be affected by message reception by the node (102-1) and the other node (102-2). The number of nodes (102, 106, 107) affected by the message transmission and message reception at the node (102-1) and the other node (102-2) is affected by the transmit power of the control messages sent by the node (102-1) and the other node (102-2). The node (102-1) further bases routing decisions on the calculated link costs.

22 Claims, 6 Drawing Sheets

U.S. PATENT DOCUMENTS

| | | | |
|---|---|---|---|
| 2004/0165532 A1* | 8/2004 | Poor et al. | 370/238 |
| 2004/0246900 A1* | 12/2004 | Zhang et al. | 370/238 |
| 2005/0003846 A1 | 1/2005 | Anderson | |
| 2006/0268787 A1 | 11/2006 | Strutt | |
| 2007/0002804 A1* | 1/2007 | Xiong et al. | 370/335 |

OTHER PUBLICATIONS

Hideaki Takagi et al, Optimal Transmission Ranges for Randomly Distributed Packet Radio Terminals, IEEE Transactions on Communications, No. 3, Mar. 1984, pp. 246-257.

Kleinrock, L. et al., Optimum Transmission Radii for Packet Radio Networks or Why Six Is a Magic Number, Proc. IEEE National Telecommunications Conference, Dec. 3-6, 1978, pp. 4.3.1-4.3.5.

Rodoplu, Volkan et al, Minimum Energy Mobile Wireless Networks, IEEE Journal on Selected Areas in Communications, vol. 17, No. 8, Aug. 1999, pp. 1333-1344.

Ramanathan, R. et al., Topology Control of Multihop Wireless Networks using Transmit Power Adjustment, Proceedings of the IEEE Conference on Computer Communications (INFOCOM), Tel Aviv, Israel, Mar. 2000, pp. 404-413.

Wattenhofer, R. et al, Distributed Topology Control for Power Efficient Operation in Multihop Wireless Ad Hoc Networks, Proc. IEEE INFOCOM, Apr. 2001, pp. 1388-1397.

PCT/US06/39740, PCT Search Report and Written Opinion, mailed Apr. 20, 2007, 9 pages.

X. Wu et al., Fair Scheduling with Bottleneck Consideration in Wireless Ad-hoc Networks, International Conference on Computer Communications and Networks (ICCCN), IEEE, 2001, pp. 568-572.

PCT/US2006/039740, PCT Preliminary Report on Patentability, mailed May 22, 2008, 7 pages.

Korean Patent Office—Korean Application No. 10-2008-7013603—(Translation) Office Action mailed Apr. 8, 2010.

Korean Patent Office—Korean Application No. 10-2008-7013603—(Translation) Office Action mailed Aug. 30, 2010.

\* cited by examiner

SYSTEM AND METHOD FOR PERFORMING TOPOLOGY CONTROL IN A WIRELESS NETWORK

FIELD OF THE INVENTION

The present invention relates generally to wireless communication networks and, more particularly, to a system and method for performing topology control in wireless network by calculating link costs and making routing decisions and transmission power adjustments based on the calculated link costs.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, now U.S. Pat. No. 7,072,650, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165 and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

Topology control, as understood in the art, is performed to enable a node to selecting neighboring nodes for routing packets in such a way as to optimize communication. In general, topology control includes the operation of adjusting the transmission power of nodes in a wireless multi-hop network in order to create a desired topology. In most topology control schemes, each node determines its transmission power in a distributed manner, for example, by adjusting its transmit power based on its number of neighbors (i.e., the "node degree").

A constraint on topology control is that it should not harm the connectivity of the network, while the benefits of performing topology control are twofold. First, topology control enables nodes in a wireless network to save energy by reducing their transmission power. Second, topology control enhances the network capacity of a network due to the potential for more concurrent transmissions with less interference. The later benefit, however, could come at a cost, since with less transmission range, there could be more intermediate hops required for an end-to-end flow.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
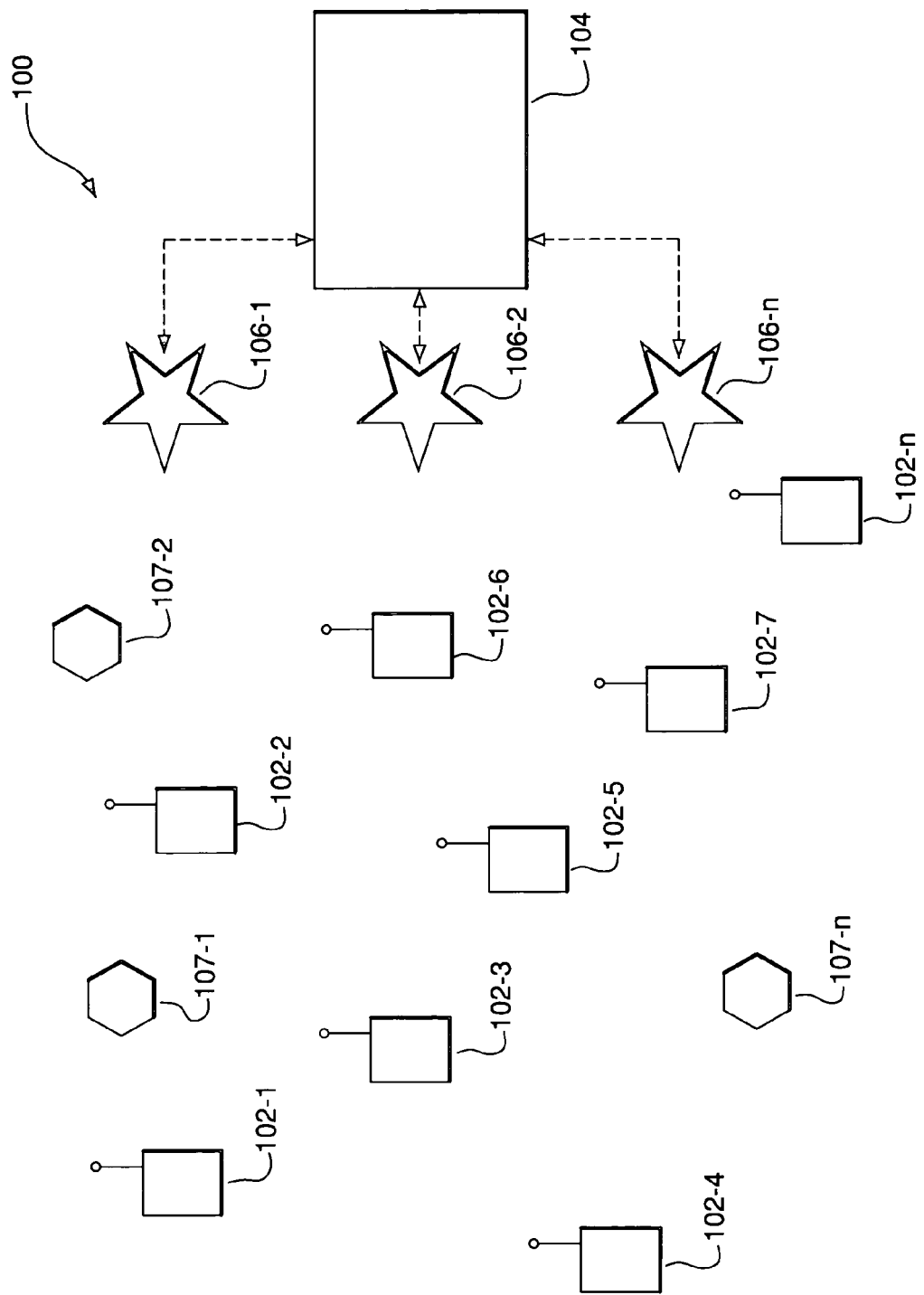
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for performing topology control in a wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for performing topology control in a wireless network as described herein. The non-processor circuits may include, but are not limited to, a radio receiver, a radio transmitter, signal drivers, clock circuits, power source circuits, and user input devices. As such, these functions may be interpreted as steps of a method for performing topology control in a wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for performing topology control in a wireless network. The system and method operate to enable a node to receive information from a plurality of other nodes in the network, and to determine parameters pertaining to the other nodes based on the information received by the node from the other nodes. The node then calculates link costs of the links between itself and the other nodes based on the parameters. The node further bases routing decisions on the calculated link costs.

The present invention further provides a system and method for controlling the transmission power of a packet transmitted by a node in a wireless network, such as a wireless ad-hoc multihopping network. The system and method perform operations to determine a value representing an ability of a transmitting node to adapt transmission parameters of a data packet to be transmitted over a link between the transmitting node and a receiving node based on conditions of the link (i.e., "a link adaptation value"). For example, the system and method operate to determine whether the node is transmitting packets over a link between itself and a receiving node. The system and method select the link by taking into account network topology issues. When the node is transmitting packets, the system and method adjust a transmit power at which the node is to transmit a packet over the link based on a representative data rate at which the packets are being transmitted and a target data rate, and when the node is not transmitting packets, the system and method adjust the transmit power at which the node is to transmit the packet over the link based on a condition of the link.

The present invention also provides a system and method for selecting routes to and from a node in a wireless network, such as a wireless ad-hoc multihopping network. The system and method perform the operations of determining the level of transmit and receive activity of nodes in the network that are within the same neighborhood as the node, determining the number of nodes which would receive control packets transmitted by the node, and determining the number of nodes whose control packets would be received by the node, based on the comparison of the respective transmit power of the control packets and the measured path loss values of the links between the nodes. The system and method then operate to select the routes to and from the node based on the results of these determinations.

The details of an embodiment of the present invention will now be described.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of intelligent access points 106-1, 106-2, . . . 106-n (referred to generally as nodes 106, access points (APs) 106, or intelligent access points (IAPs) 106), for providing nodes 102 with access to the fixed network 104. The fixed network 104 can include, for example, a core local access network (LAN) or wide area network (WAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, wireless routers (WRs) 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839, referenced above.

Figure 2:
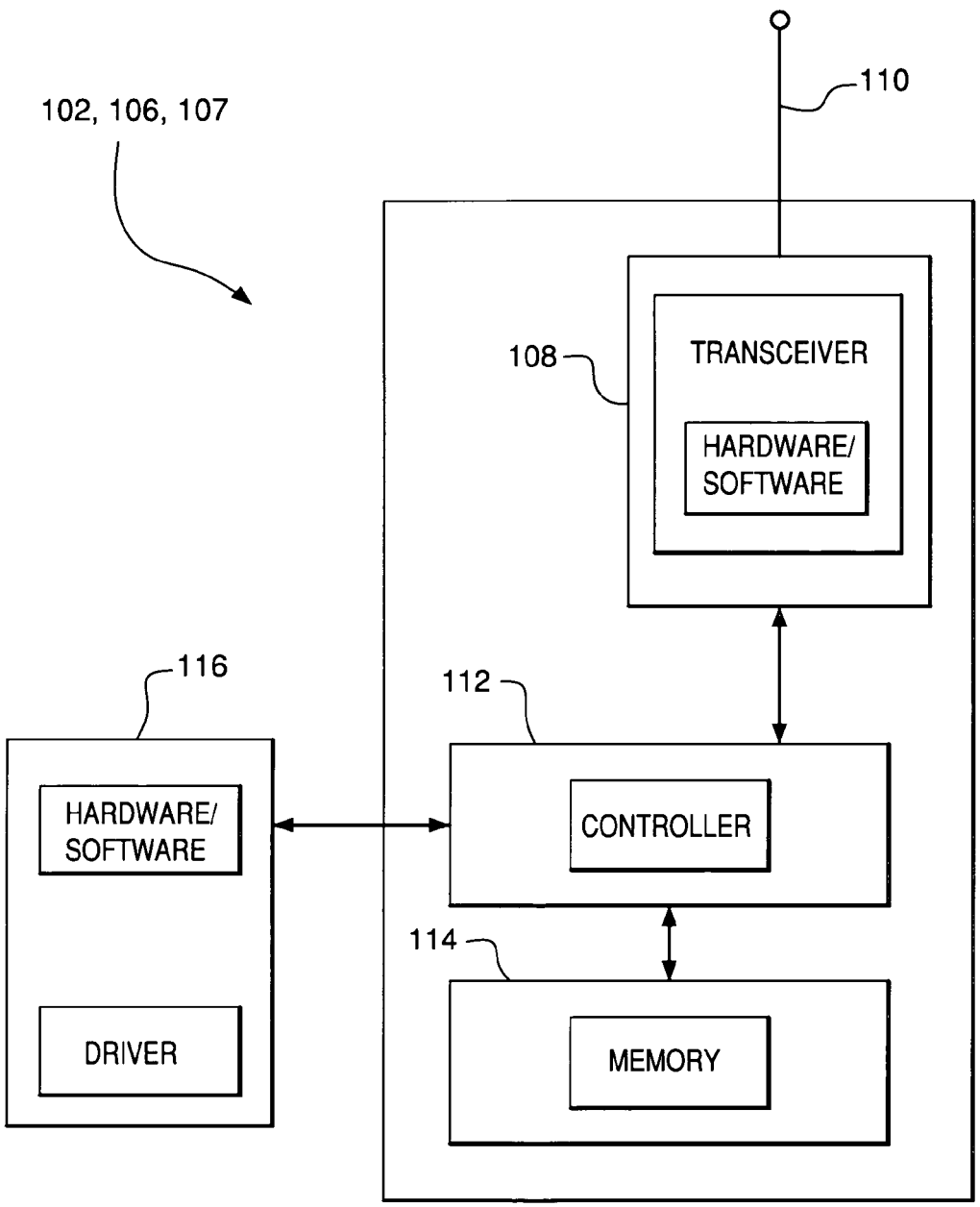
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

It is noted that the following description at times references mobile nodes 102 as shown in FIG. 1. However, the following processes, operations and so on can be performed by and can be applicable to any type of node 102, 106 or 107 shown in FIG. 1.

Before describing the operations of the embodiments of the present invention in detail, certain characteristics of the network 100 and nodes 102, 106 and 107 in which the embodiments of the present invention are used will now be explained. It is noted that the following descriptions are merely exemplary features of the network 100 and nodes 102, 106 and 107 for purposes of describing the embodiments of the present invention, and can be embodied in any suitable manner as can be appreciated by one skilled in the art.

Topology Control:

As can be appreciated by one skilled in the art, topology control is performed to increase network capacity by increasing spatial reuse. Increased spatial reuse is made possible by operating the nodes 102, 106 and 107 to lower the transmit power of control packets or frames. By lowering the transmit power of control frames, more nodes 102, 106 and 107 can transmit at the same time, which partially solves the exposed node problem commonly experienced in ad-hoc or multihopping networks such as network 100. As understood in the art, the exposed node problem occurs when a node (e.g., a node 102 as shown in FIG. 1) inadvertently receives a packet transmission between other nodes 102, 106 or 107 and assumes that it cannot transmit a packet to another node 102, 106 or 107 at that time, when in actuality, the node 102 can perform the transmission. Topology control can also reduce the overall transmission power of the network 100 and therefore reduce interference and energy consumption, as is made possible by lowering the transmit power of data packets.

Assumptions:

A topology control algorithm which affects only the transmit power of the control and data frames, and which does not schedule transmissions or make transmission decisions, can be limited by the nature of the media access control (MAC) on which the algorithm operates. In this regard, the following MAC characteristics can be presumed to be true for the embodiments of the present invention described herein. However, as can be appreciated by one skilled in the art, it is not necessary to assume all or even any of these MAC characteristics in order to perform the techniques according to the embodiments of the present invention described herein. In either event, the assumptions for this example are as follows:

- There is no carrier sensing. The MAC is based on Carrier Sensing Multiple Access with Collision Avoidance (CSMA/CA) or Virtual Carrier Sensing.
- If a node 102, 106 or 107 receives an undirected request to send (RTS) message, the node 102, 106 or 107 is not precluded from sending a packet.
- If a node 102, 106 or 107 receives an undirected clear to send (CTS) message, the node 102, 106 or 107 is not precluded from receiving a packet.
- Access to the medium is half duplex, that is, transceivers 108 do not transmit and receive at the same time.
- There is only one communication channel used by the nodes 102, 106 and 107. With a multi-channel MAC, the benefits of topology control will be experienced once the number of active communications in a neighborhood exceeds the number of available channels.

The nature of the MAC that forms the basis for topology control does not depart significantly from traditional MACs such as the Institute of Electrical and Electronic Engineers (IEEE) Standard 802.11 Basic Service Set (BSS). Rather, according to an embodiment of the present invention, topology control is performed with a MAC having the characteristics described above. The topology control operations may also increase the capacity of network 100 which operates using a MA, such as the Mesh Enabled Architecture (MEA) provided by Motorola, Inc.

Topology Control and Fairness:

The reduction in control packet transmit power is meant to have no effect, or at least no meaningful effect, on the MAC's ability to withstand interference and avoid collisions. It is possible, however, that nodes 102, 106 or 107 communicating at low transmission power will be unable to access the channel as often as nodes 102, 106 or 107 communicating at a higher transmission power. Moreover, it may be difficult for the nodes 102, 106 and 107 to access the channel fairly when all transmit powers of the nodes 102, 106 and 107 are equal, and the topology control process can exacerbate this problem as can be appreciated by one skilled in the art. Accordingly, the embodiments of the present invention employ techniques to enable the nodes 102, 106 and 107 to access the channel fairly as discussed in more detail below.

Reduction of the Neighborhood Size:

As can be appreciated by one skilled in the art, because topology control algorithms generally favor links of nodes 102, 106 or 107 that have fewer neighbors, it is likely that the overall transmit power of each node 102, 106 and 107 will be reduced, thus limiting the number of active neighbors in each neighborhood. The topology control process according to the embodiments of the present invention described herein therefore attempt to reduce the neighborhood size enough to allow for spatial reuse to occur, even in extremely dense networks.

Network Stability:

The topology control process can affect routing by applying a penalty on links that potentially prevent the most spatial reuse. However, it can be difficult for a node 102, 106 or 107 to determine whether or not a new link will limit spatial reuse. Therefore, the risk that the network 100 will become unstable and routes will change often can be increased by performing topology control processes. According, the topology control processes according to the embodiments of the present invention employ a hysteresis technique in the routing protocols to prevent such instabilities from occurring. An example of such hysteresis technique is described in a copending U.S. Provisional Patent Application entitled "System and Method for Providing Routing Specifications for a Wireless Communication System," Ser. No. 60/622,168, filed on Oct. 27, 2004, the entire content of which is incorporated herein by reference.

Topology Control and Link Adaptation:

As can be appreciated by one skilled in the art, a topology control process generally has no direct effect on link adaptation, since each link is typically maintained by a link adaptation algorithm which can operate to maximize the quality of a link. Topology control processes also generally do not modify the transmit parameters of the transceiver 108 of the nodes 102, 106 or 107 when the nodes are transmitting packets.

However, a topology control can have an indirect effect on the transmit power and data rates used by a node 102, 106 or 107 in the following circumstances:

- A topology control process typically determines the neighbors with which the node 102, 106 or 107 communicates, thus potentially eliminating high-power links in favor of low-power links.
- A topology control process also indirectly affects the overall transmit power of the neighbor nodes 102, 106 and/or 107, thus reducing interference and allowing for higher data rates and lower powers to be used locally in the neighborhood.

The power level at which a control packet or data packet is transmitted, on the contrary, can be determined by a topology control module, which can be included, for example, in the controller 112 and associated hardware and software, and ensures that the MAC only need contend with potentially interfering nodes and allows for increased spatial reuse in the network. The different adaptation mechanisms, in this regard, are described below.

Data Packet Link Adaptation:

Link adaptation for data packets can be performed by a link adaptation algorithm as described, for example, in a copending U.S. Pat. application entitled "Method and System for Controlling the Transmission Power of at Least One Node in a Wireless Network", Ser. No. 11/138,241, filed on May 24, 2005, now U.S. application Publication No. US20060268787A1, the entire content of which is incorporated by reference. As described above, a link adaptation value represents an ability of a transmitting node to adapt transmission parameters of a data packet to be transmitted over a link between the transmitting node 102, 106 or 107 and a receiving node 102, 106 or 107 based on conditions of the link. This adaptation value is can generally be determined when traffic is being sent to a node 102, 106 or 107. However, a typical data packet link adaptation value calculation generally cannot be performed if there is no route to the destination node 102, 106 or 107 or if there is no traffic being sent to the destination node 102, 106 or 107 other than the traffic used to maintain the route.

Accordingly, since RTS and CTS transmit powers are dependent on data packet transmit powers, it is necessary to provide an estimated link adaptation value for each link on which there is no traffic being sent as discussed below.

RTS Link Adaptation:

In a topology control process according to an embodiment of the present invention, the transmit power of the RTS sent by a node (e.g., a node 102 as shown in FIG. 1) should be sufficient to reach all the active neighbor nodes 102, 106 and/or 107 which are also precursors, and, in particular, a next hop to the destination node 102, 106 and/or 107. For purposes of this discussion, it will be assumed that a node 102 is transmitting the RTS message. The definition of "precursor", in this regard, is a node 102, 106 or 107 which has a direct route to the node 102. For bidirectional links, all precursors are, by definition, next hop nodes 102, 106 or 107 of the node 102.

The estimated transmit power for RTSs is calculated using a combination of the calculated data packet link adaptation value and an estimated path loss based on the measured path loss. The estimated path loss ensures that the RTS will reach most of the neighbor nodes 102, 106 and/or 107, because it is typically a short packet with a large amount of processing gain. Because of channel conditions (e.g., multi-path and noise), the predicted transmit power is usually not high enough to ensure that a reliable communication can take place using the best data rate. Therefore, when a link is being actively used, the RTS transmit power should converge toward the data packet transmit power, which is calculated for every active asynchronous transfer protocol (ATP) link after each transmission.

Figure 3:
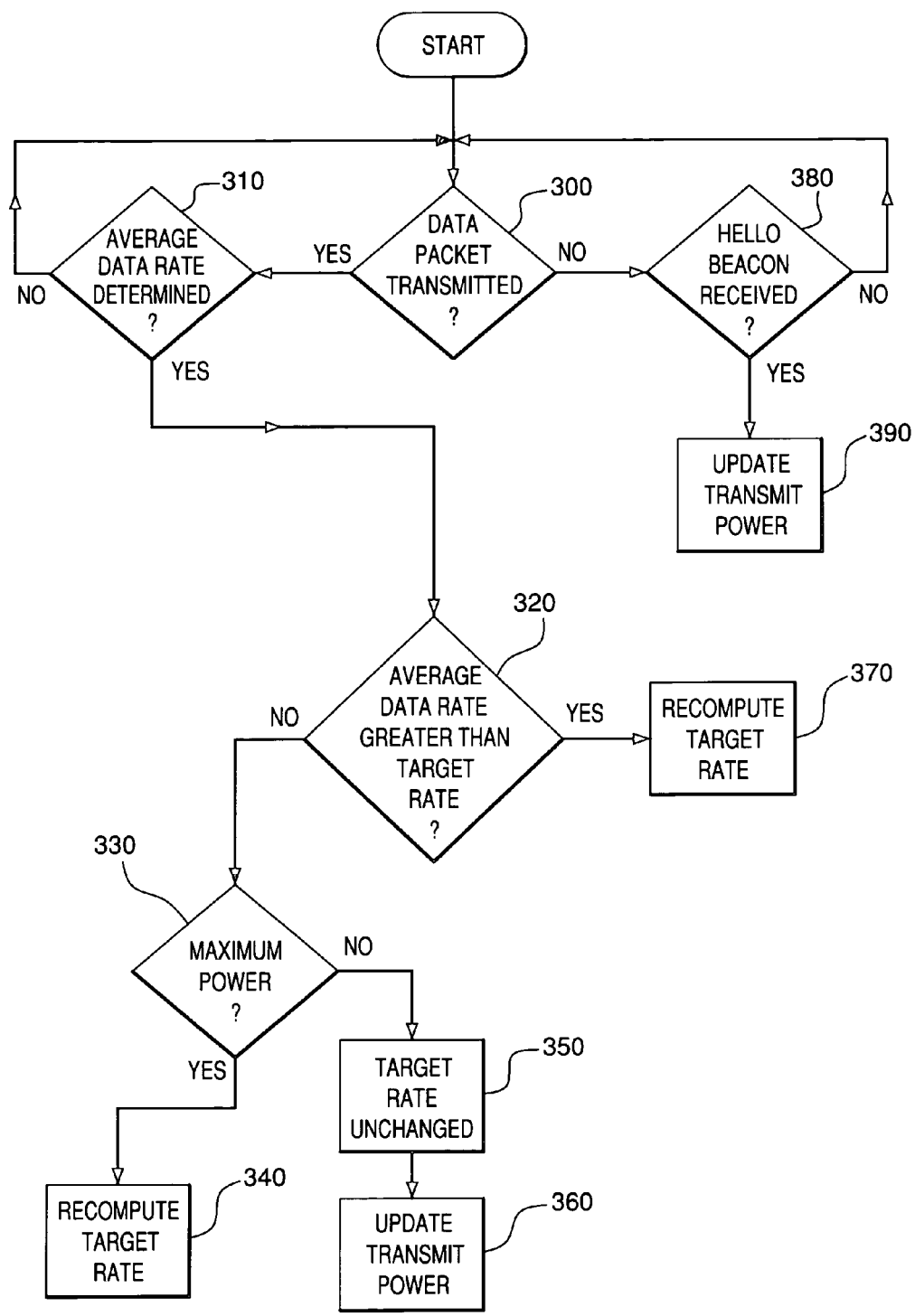
FIG. 3 is a flow chart illustrating an example of operations of a transmit power selection process performed by a topology control process in accordance with an embodiment of the present invention.

The RTS transmit power is preferably updated for every received "hello" packet and transmitted data packet. FIG. 3 illustrates an example of a process for updating the RTS transmit power of a node (e.g., a node 102 as shown in FIG. 1). It is noted that these operations, as well as all other power adjustment, topology control and related operations, can be performed by the controller 112 of the node 102 and its associated hardware and software. Also, as discussed above, these operations are described with regard to a node 102 for exemplary purposes, but can be performed by any node 102, 106 or 107.

The process described in FIG. 3 attempts to ensure that when data is being transmitted, the transmit power estimation for control frames is almost entirely governed by the ATP calculation which is based on the target data rate. In particular, when the process determines in step 300 that a data packet is transmitted by a node (e.g., a node 102-1 as shown in FIG. 1), the process ascertains in step 310 whether an average data rate (e.g. a representative data rate) can be determined. If the average data rate cannot be determined, the process awaits for another data packet transmission, for example. However, if the average data rate can be determined, the transmission power is updated on based on a target data rate. That is, in step 320, the average data rate is compared to a target data rate. If the average data rate is determined to be not greater than the target rate in step 320, and if it is determined in step 330 that the power reached maximum power, then the target rate is recomputed in step 340. If the maximum power has not been reached, then the target rate remains unchanged in step 350, and the transmit power is updated (e.g., increased) in step 360.

On the other hand, if the average data rate is determined to be higher than the target in step 320, then the target rate is recomputed in step 370.

When the process determines in step 300 that no data packets are being transmitted, the transmit power is estimated based on control frames. That is, when a "hello" message is received by the node 102-1 in step 380, transmission power of the node 102-1 is updated (e.g., increased or decreased) in step 390 based on, for example, the path loss of a link between the transmitting and receiving nodes, which can be any of nodes 102, 106 and 107 described with regard to FIG. 1. The path loss (PL) is determined based on the following equation:

$$PL = T_x\text{power} - RSSI$$

where $T_x$power represents the power at which the hello message was transmitted (this information can be included in the hello message by the node 102, 106 or 107 that transmitted the hello message) and RSSI is the received signal strength indicator.

Accordingly, the transmit power (P) of the transmitting node 102-1 can be adjusted based on the following formula:

$$P = \lambda P + (1-\lambda)(PL - \text{Target } R_x\text{power})$$

where PL represents the path loss, $\lambda$ represents a forgetting factor, Target $R_x$power represents the power at which data packets should be received by the receiving node (e.g., a node 102, 106 or 107). As can be appreciated by one skilled in the art, the forgetting factor $\lambda$ is a number within the range $1 \geq \lambda \geq 0$ that is determined based on age of the previously set transmit power. In other words, the value of $\lambda$ is initially set to 1 (one) when the transmit power P for a packet is initially set. As the length of time from this initial transmit power setting increases, the value of $\lambda$ decreases toward 0 (zero) so that more weight is given to the factor (PL−Target $R_x$power). Hence, the transmit power at which subsequent data packets are transmitted by node 102-1 are based more on the path loss (PL) and the Target $R_x$power and less on the initial power setting P. Eventually, the value of $\lambda$ becomes 1 (one) and the value of the transmit power P is determined based entirely on the value of the path loss less the target received power (i.e., PL−Target $R_x$power). Hence, the value of the transmit power converges on a value that is based on the path loss.

In addition to the above, the following other criteria can be considered by the topology control process according to the embodiments of the present invention described herein.

CTS Link Adaptation:

The transmit power of a CTS from a node 102, 106 or 107 should be sufficient to reach all known active neighbor nodes 102, 106 and/or 107, including the source of the RTS, which in the example described above is node 102-1.

Hello Packet Link Adaptation:

Nodes 102, 106 and 107 typically transmit "hello" packets at maximum power. In very high density situations (i.e., if the number of active neighbor nodes 102, 106 and/or 107 is large), the transmission interval of "hello" packets should be reduced in order to conserve bandwidth.

Topology Cost:

When a node (e.g., node 102-1) establishes a route through its neighbor nodes 102, 106 and/or 107, the node 102-1 preferably computes the topology cost of each link as described in more detail below, and determines the actual route metric accordingly.

Neighbor Cost Estimation:

The neighbor cost estimation is preferably performed by operating a node (e.g., node 102-1) to maintain a list of parameters for each neighbor node 102, 106 and/or 107, and then calculating the cost for using a particular link to a neighbor node 102, 106 or 107. For purposes of this explanation, the cost of a link can be described, in general, as the degree by which the ability of the neighbor nodes 102, 106 and/or 107 is impacted by the node 102-1 choosing to use this particular link As described below, the parameters are either provided to the node 102-1 by the neighbor nodes 102, 106 and/or 107 as, for example, information in the hello messages, or are derived (i.e., the node 102-1 determines particular parameter values):

Informed parameters—Each node 102, 106 and/or 107 advertises in the "hello" messages the following information:

Path loss/range of their RTS message (which is the path loss to their furthest next hop). If the node 102, 106 or 107 is not actively transmitting, this value is set to 0, regardless of the actual transmit power value.

Packet receipt activity, indicating the amount of packets that the node 102, 106 or 107 is receiving.

Derived Parameters—Each node 102, 106 and 107, upon receiving a hello message from a neighbor, preferably computes the following information:

Path loss to the node 102, 106 or 107 that transmitted the hello message. This can be determined based on received signal strength of the hello message, and can indicate whether the node 102, 106 or 107 is a sensitive neighbor or an active neighbor.

Estimated transmit power to the node 102, 106 or 107 that transmitted the hello message. This also can be determined based on the received signal strength of the hello message.

These parameters (i.e., the path losses of the RTS massages and the path losses to the nodes 102, 106 and 107) are then used to in the link cost computation as follows:

Link Cost Computation - The cost from a node (e.g., node 102-1, which is referred to as the "requester") to a neighbor (e.g. another node 102-2, which is referred to as the "replier") is preferably equal to a combination of four parameters $C_{Tx,req}$ - The number of nodes 102, 106 and/or 107 for which the RTS path loss of the requester node 102-1 is larger than their respective path loss to the requester node 102-1. This number excludes the source of the request (i.e.,. the source node 102-1) and destination of the request (e.g., node 102-2), as well as the next hops to the source and destination nodes 102-1 and 102-2. This variable thus indicates the number of nodes 102, 106 and/or 107 whose communication will be impacted by the requestor node 102-1 sending an RTS message to the replier node 102-2 over the link;

$C_{Rx,req}$ - The number of nodes 102, 106 and/or 107 that are active receivers for which the path loss between the requester node 102-1 and the replier node 102-2 is larger than their respective path loss to the requester node 102-1. This number excludes the source and destination nodes 102-1 and 102-2 as well as the next hops to the source and destination nodes 102-1 and 102-2. This variable thus indicates the number of nodes 102, 106 and/or 107 whose communication will be impacted by the requestor node 102-1 communicating with the replier node 102-2 over the link;

$C_{Tx,rep}$ - The number of nodes 102, 106 and/or 107 for which the RTS path loss from the replier node 102-2 is larger than their respective path loss to the replier node 102-2. This number excludes the source and destination nodes 102-1 and 102-2 as well as the next hops to the source and destination nodes 102-1 and 102-2. This variable thus indicates the number of nodes 102, 106 and/or 107 whose communication will be impacted by the replier node 102-2 sending an RTS message to the requester node 102-1 over the link; and $C_{Rx,rep}$ - The number of nodes 102, 106 and/or 107 that are active receivers for which the path loss between the requester node 102-1 and the replier node 102-2 is larger than their respective path loss to the replier node 102-2. This number excludes the source and destination nodes 102-1 and 102-2 as well as the next hops to the source and destination nodes 102-1 and 102-2. This variable thus indicates the number of nodes 102, 106 and/or 107 whose communication will be impacted by the replier node 102-2 communicating with the requestor node 102-1 over the link.

It is noted that as discussed above, in order for the link cost computation to be stable, the values of the four variables $C_{Tx,req}$, $C_{Rx,req}$, $C_{Tx,rep}$ and $C_{Rx,rep}$ all preferably exclude:

The source of the request (i.e., the requester node 102-1),

The destination of the request (i.e., the replier node 102-2),

The next hop to the source of the request (i.e., the next hop to node 102-1 from node 102-2); and The next hop to the destination of the request (i.e., the next hop to node 102-2 from node 102-1).

The topology cost (C) of a link is equal to the maximum value of the four values $C_{Tx,req}$, $C_{Rx,req}$, $C_{Tx,rep}$, $C_{Rx,rep}$ determined above, as indicated by the following equation:

$$C = \mathrm{Max}(C_{Tx,req}, C_{Rx,req}, C_{TX,rep}, C_{Rx,rep})$$

Total Topology Cost:

The "total topology cost" of the network 100 is therefore the sum of all the link costs in a network (e.g., network 100 as shown in FIG. 1) having established routes. The topology cost, in this example, is a measure of the number of links that are competing against one another. The lower the topology cost, the lower the contention in the network 100, and the higher the performance (taking into account, of course, the extra latency and congestion that is incurred when the number of hops per route is increased).

As can be appreciated from the above, the topology cost represents the loss of capacity that can occur in a network 100 due to optimal scheduling. It should be noted, however, that the sum of all the link costs may provide a redundant view of the loss of capacity.

Figure 4:
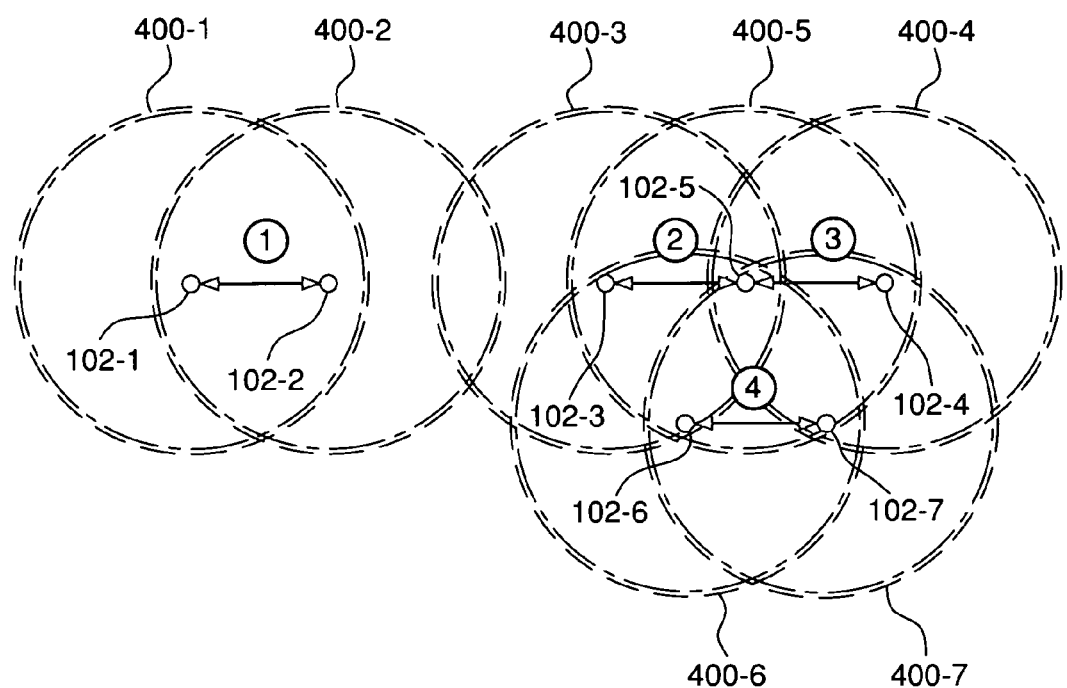
FIG. 4 is a network topology diagram illustrating an example of communication between nodes of the network shown in FIG. 1 according to an embodiment of the present invention.

FIG. 4 illustrates an example of a topology diagram illustrating communication between mobile nodes 102-1 through 102-7, with the dashed circles around the mobile nodes 102-1 through 102-7 representing the transmission ranges 400-1 through 400-7 of the respective nodes. If a node (e.g., node 102-1) is communicating with one neighbor only (e.g., 102-2) and the traffic flow is designated as traffic flow 1, both nodes 102-1 and 102-2 may increase the cost of another link, although one node would have sufficed, since the transceivers 108 in the nodes (e.g., nodes 102-1 and 102-2) are assumed to be all half-duplex. In FIG. 4, nodes 102-3 and 102-4 each communicate with node 102-5, and these communications are designated as traffic flows 2 and 3, respectively. Also, nodes 102-6 and 102-7 communicate with each other, as designated by traffic flow 4.

Figure 5:
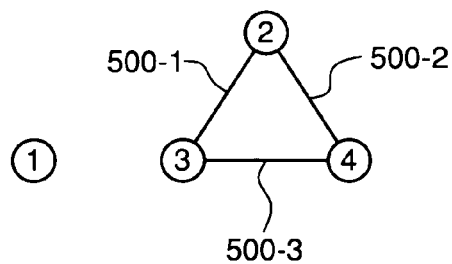
FIG. 5 is a traffic configuration diagram based on the network topology diagram shown in FIG. 4.

FIG. 5 illustrates a flow contention diagram that models spatial contention relationship among flows as described, for example, in "Fair Scheduling with Bottleneck Consideration in Wireless Ad-hoc Networks" by X. Wu, C. Yuen, Y. Gao, H. Wu and B. Li published in IEEE International Conference on Computer Communications and Networks (ICCCN) 2001. In this diagram, the circles 1 through 4 represent the flows as shown in FIG. 4 and the edges 500-1 through 500-3 connecting the circles indicate when the flows can be backlogged due to contention. As can be appreciate from this diagram, flow 1 can occur communicate simultaneously with flows 2, 3 and 4, while flows 2, 3 and 4 contend with each other.

The total topology cost can also be calculated as a measure of the number of links that contend with each other according to an embodiment of the present invention. The topology cost can therefore be computed according to the following equation:

$$\text{Topology Cost} = \left[ \text{Number of distinct edges} - \frac{\text{Number of active links}}{\text{Number of traffic flows}} \right]$$

The term in the formula "number of active links" accounts for the intermediate nodes that receive packets from one node 102, 106 or 107 (i.e., a precursor node) and forward the packets to another node 102, 106 or 107 (i.e., a next hop node). Although the flows between an intermediate node 102, 106 or 107 and its precursor and next hop nodes 102, 106 and/or 107 contend with each other, thus forming an "edge", this edge is not counted as a topology cost since this is due to the half duplex transceiver assumption. It should also be noted that this topology cost does not differentiate the cost increase or reduction due to multihopping. For this purpose, a graph according to FIG. 5 having weighted edges can be used to take into account the changes in the goodput due to multihopping.

Effect on Routing Metric:

As can be appreciated by one skilled in the art, the topology cost affects the available capacity of a link. For example, when the topology cost is null or zero, a link can use all its available bandwidth. Each topology cost unit represents a node utilizing the bandwidth in the neighborhood. It is difficult to establish a one-to-one correlation between the topology cost and the reduction in bandwidth capacity because some nodes may be unnecessarily counted multiple times.

For a communication system with automatic repeat request (ARQ) capability, the link delay at hop h may be computed in accordance with an embodiment of the present invention based on the following equation:

$$T_d(h) = t_w(h) + \sum_{i=1}^{\infty} (1 - PCR(L(h), R(h)))^{i-1} PCR(L(h), R(h))$$

$$(i\, t_s(L(h), R(h)) + (i-1)t_e(h))$$

$$= t_w(h) + \frac{t_s(L(h), R(h)) + (1 - PCR(L(h), R(h)))t_e(h)}{PCR(L(h), R(h))}$$

where $T_d(h)$ is the average delay at hop h
L(h) is the reference (or average) packet size at hop h
$t_s$ is the total transmit time, including overhead, as a function of the data rate and packet size
$t_e(h)$ is the extra time required for retransmission at hop h
$t_w(h)$ is the waiting time at the first transmission attempt at hop h
R(h) is the average data rate at hop h
PCR(H) is the packet completion at hop h
For a tagged packet along a route, the total average delay is $$\sum_{h=1}^{H} T_d(h)$$

where H is the number of hops.

The goodput G(h) at each hop can be computed as $G(h)=L(h)/T_d(h)$. In this regard, the aim of the topology control is to increase total goodput in a given neighborhood. If topology cost (C) increases, for example, G will decrease. Topology control affects $t_w$, $t_e$ and H for a traffic flow. The variable $t_e$ is a function of the retransmission backoff time and the traffic of the neighbors that may transmit at that time (i.e. contention degree). The variable $t_w$ is a function of the packets ahead in the node queue and the traffic of the neighbors that may transmit at that time. Topology control aims to decrease the contention degree, which may require increasing H, which overall delay should be decreased.

If the route metric is chosen as $$M = \alpha \sum_{h=1}^{H} T_d(h),$$

since $t_w$ and $t_e$ contain topology cost when optimal topology is not chosen, the metric with topology cost greater than 1 can be written as:

$$M = \alpha \sum_{h=1}^{H} C(h)t_w(h) + \frac{t_s(L(h), R(h)) + (1 - PCR(L(h), R(h)))C(h)t_e(h)}{PCR(L(h), R(h))}$$

where C(h) is the topology cost for hop "h" and α is an arbitrary scaling factor.

Route Selection:

Different techniques for selecting routes in accordance with an embodiment of the present invention will now be described.

Unicast Technique:

A requesting node 102-1 that issues or forwards a route request message (e.g., by unicasting the route request) computes the variables $C_{Tx, req}$ and $C_{Rx, req}$ which are described above. The requesting node 102-1 includes information pertaining to the maximum of the two variables $C_{Tx, req}$ and $C_{Rx, req}$ in the route request. The recipient node 102-2 in turn computes the variables $C_{Tx, rep}$ and $C_{Rx, rep}$ as discussed above. The requesting node 102-1 then computes the final link cost as the maximum of $C_{Tx,req}$, $C_{Rx,req}$, $C_{Tx, rep}$, and $C_{Rx, rep}$. To locate additional links, the requesting node 102-1 can further employ a scouting procedure as described, for example, in a copending U.S. Pat. application entitled "System and Method to Scout for Routes in a Wireless Network", Ser. No. 10/986,698, filed on Nov. 12, 2004, now U.S. application Publication No. US20060104205A1, the entire content being incorporated herein by reference. Assuming that the requesting node 102-1 has multiple links from which to choose, the requesting node 102-1 can select for routing the link having the lowest link cost.

Broadcast Technique

In accordance with an embodiment of the present invention, the node 102-1 can perform a broadcast technique to determine the link costs along a route. The broadcast technique is similar to the unicast technique described above, with the exception that the path loss to the recipient of the route request (i.e., destination node 102-2) is used to determine a value for the variable $C_{Rx,req}$. Therefore, the scouting procedure as discussed above is employed to identify the links to the destination node 102-2. The destination node 102-2 responds to all requests received via the various paths to the source node 102-1. The source node 102-1 then determines the best route to the destination node 102-2 based on the route replies that the source node 102-1 receives, and sends a gratuitous route reply through the route that the source node 102-1 has selected, in order to ensure that the reverse route is properly established.

Figure 6:
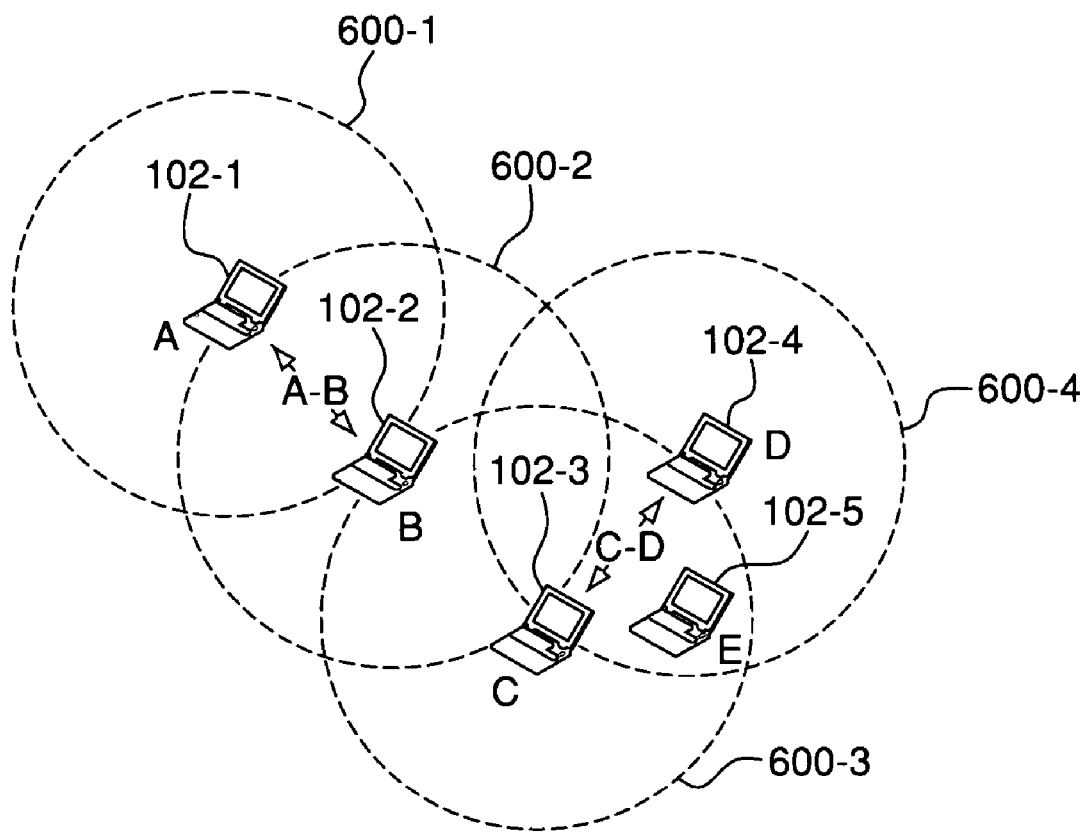
FIG. 6 is a network topology diagram illustrating an example of communication flow paths between nodes of the network shown in FIG. 1 according to an embodiment of the present invention.
Figure 7:
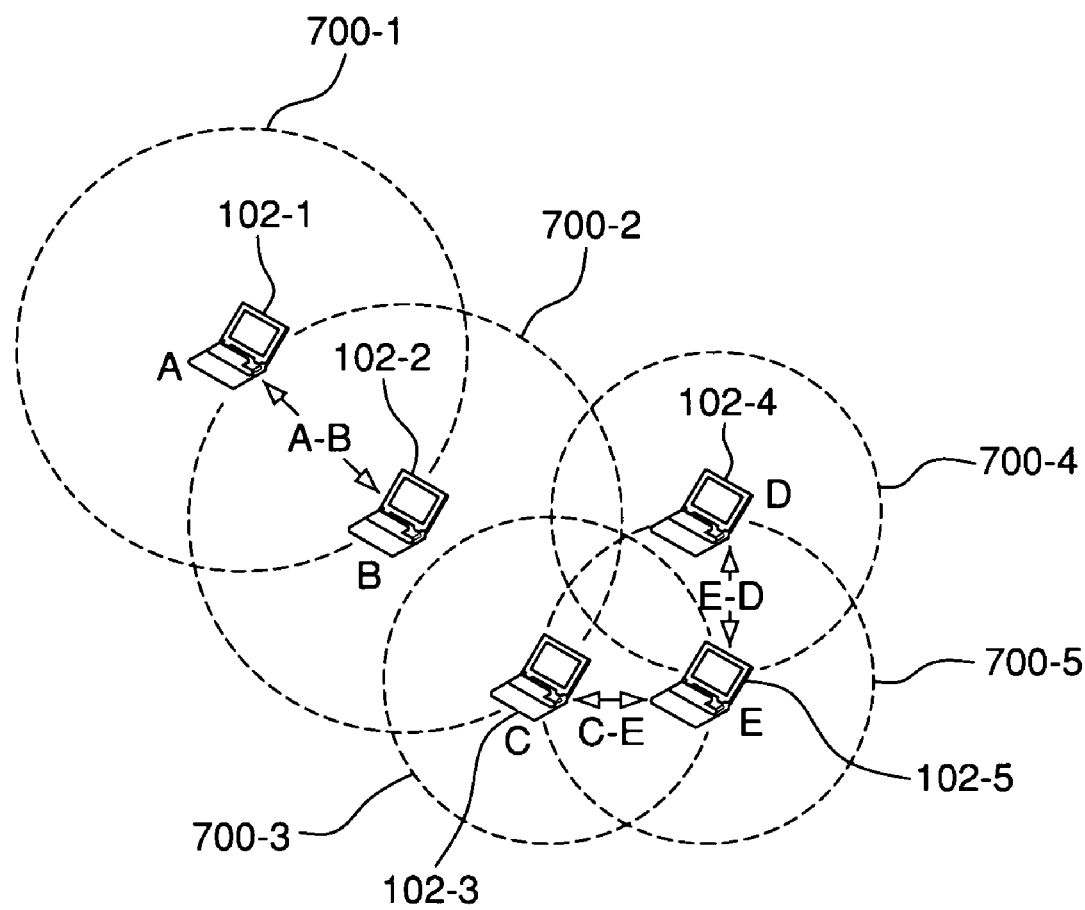
FIG. 7 is a network topology diagram illustrating an example of communication flow paths between nodes of the network shown in FIG. 1 to increase the value of the throughput of the flows according to an embodiment of the present invention.

The examples depicted in FIGS. 6 and 7 show that the application of topology control on a simple network can greatly enhance capacity, for example, from 0.9 megabits per second (Mbps) to 01.3 Mbps. Specifically, FIG. 6 shows two communication flows, one flow being between two nodes (e.g., nodes 102-1 and 102-2) designated as nodes A and B, respectively, and the other between two nodes (e.g., nodes 102-3 and 1024) designated as nodes C and D, respectively. Node 102-5 is represented as node E in this example. The distances between nodes A and B, between nodes B and C, and between nodes C and D, are the same or about the same in this example. The distance between nodes C and E is less than the distance between nodes C and D, and the distance between nodes D and E is also less than the distance between nodes C and D. The dashed circles 600-1 through 600-4 represent the respective transmission ranges of the nodes A through D, respectively. The transmitter power chosen at nodes B and C are such that they can receive each other's transmissions. This prevents either flow from achieving the maximum throughput since they have to occupy the medium at the other's expense. In this example, the overall capacity in the network 100, which is the sum of the individual throughput values of both the flows, can be about 0.9 Mbps.

FIG. 7 shows the same scenario as shown in FIG. 6, and the same communication flows, except that node C communicates with node D through node E. As illustrated, the distances between nodes A and B, B and C, and C and D are equal, the distance between nodes C and E is less than that between nodes C D, and the distance between nodes D and E is less than that between nodes C and D. By communicating through node D, node C is able to lower its transmission power to a value that is sufficient to successfully communicate with node E. Also, if the distance between nodes C and E is less than that between nodes C and D, their communication will not interfere with the communication between nodes A and B. The two flows can coexist thereby resulting in a greater system capacity, for example, 1.3 Mbps.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for increasing a capacity of a set of wireless ad hoc multihopping nodes, the method comprising operating each node of the set of wireless ad hoc multihopping nodes to:
adjust a transmit power of a transmitter within the node to allow for effective communication with each other node of the set of wireless ad hoc multihopping nodes that it transmits information through; and
select one or more nodes of the set of wireless ad hoc multihopping nodes which the node transmits information through based at least in part on a total path metric, wherein the total path metric is calculated using an impact of the node on communication of the one or more other nodes and an impact of the one or more other nodes on communication of the node.

2. A method as claimed in claim 1, wherein the adjusting of the transmit power comprises at least one of adjusting the transmit power of a control frame and adjusting the transmit power of a data frame.

3. A method as claimed in claim 2, wherein the each other node comprises one or more precursor nodes and a destination node, and wherein the adjusting of the transmit power comprises adjusting the transmit power of a plurality of control frames each destined for the one or more precursor nodes and the destination node to a same transmit power in which a transmission of the plurality of control frames can reach each of the one or more precursor nodes and the destination node.

4. A method as claimed in claim 3, wherein the plurality of control frames comprise a plurality of request to send messages.

5. A method as claimed in claim 2, wherein the each other node comprises one or more active neighbor nodes, and wherein the adjusting of the transmit power comprises adjusting the transmit power of a plurality of control frames each destined for one of the one or more active neighbor nodes to a same transmit power in which a transmission of the plurality of control frames can reach each of the one or more active neighbor nodes.

6. A method as claimed in claim 5, wherein the plurality of control frames comprise a plurality of clear to send messages, and further wherein the one or more active neighbor nodes include a source of a request to send message.

7. A method as claimed in claim 2, wherein the adjusting the transmit power of the data frame comprises adjusting the transmit power to a transmit power in which a transmission of the plurality of control frames can reach a destination node.

8. A method as claimed in claim 1, wherein the total path metric comprises a topology cost.

9. A method as claimed in claim 8, wherein the increase in capacity of the set of wireless ad hoc multihopping nodes is inversely related to the topology cost.

10. A method as claimed in claim 1, wherein the impact of the node on communication of the one or more other nodes is proportional to a quantity of the one or more other nodes with a transmission range of the node.

11. A method as claimed in claim 1, wherein the impact of the one or more other nodes on communication of the node is proportional to a quantity of the one or more other nodes in which the node is within a transmission range.

12. A wireless ad hoc multihopping node comprising:
a transmitter for communicating with one or more other nodes within a wireless ad hoc multihopping network; and
a topology control module coupled to the transmitter, wherein the topology control module operates to:
adjust a transmit power of a transmitter within the node to allow for effective communication with each of the one or more other nodes that the wireless ad hoc multihopping node transmits information through; and
select one or more nodes of the one or more other nodes which the wireless ad hoc multihopping node transmits information through based at least in part on a total path metric, wherein the total path metric is calculated using an impact of the wireless ad hoc multihopping node on communication of the one or more other nodes and an impact of the one or more other nodes on communication of the wireless ad hoc multihopping node.

13. A wireless ad hoc multihopping node as claimed in claim 12, wherein the topology control module adjusts the transmit power of least one of a control frame and a data frame.

14. A wireless ad hoc multihopping node as claimed in claim 13, wherein each of the one or more other nodes comprises one or more precursor nodes and a destination node, and wherein the topology control module adjusts the transmit power of a plurality of control frames each destined for the one or more precursor nodes and the destination node to a same transmit power in which a transmission of the plurality of control frames can reach each of the one or more precursor nodes and the destination node.

15. A wireless ad hoc multihopping node as claimed in claim 14, wherein the plurality of control frames comprise a plurality of request to send messages.

16. A wireless ad hoc multihopping node as claimed in claim 13, wherein each of the one or more other nodes comprises one or more active neighbor nodes, and wherein the topology control module adjusts the transmit power of a plurality of control frames each destined for one of the one or more active neighbor nodes to a same transmit power in which a transmission of the plurality of control frames can reach each of the one or more active neighbor nodes.

17. A wireless ad hoc multihopping node as claimed in claim 16, wherein the plurality of control frames comprise a plurality of clear to send messages, and further wherein the one or more active neighbor nodes include a source of a request to send message.

18. A wireless ad hoc multihopping node as claimed in claim 13, wherein the topology control module adjusts the transmit power of the data frame to a transmit power in which a transmission of the plurality of control frames can reach a destination node.

19. A wireless ad hoc multihopping node as claimed in claim 12, wherein the total path metric comprises a topology cost.

20. A wireless ad hoc multihopping node as claimed in claim 19, wherein a decrease in topology cost results in an increase in capacity of a wireless ad hoc multihopping network in which the wireless ad hoc multihopping nodes operates.

21. A method as claimed in claim 12, wherein the impact of the wireless ad hoc multihopping node on communication of the one or more other nodes is proportional to a quantity of the one or more other nodes with a transmission range of the wireless ad hoc multihopping node.

22. A method as claimed in claim 12, wherein the impact of the one or more other nodes on communication of the wireless ad hoc multihopping node is proportional to a quantity of the one or more other nodes in which the wireless ad hoc multihopping node is within a transmission range.

* * * * *

UNITED STATES PATENT AND TRADEMARK OFFICE
CERTIFICATE OF CORRECTION

PATENT NO. : 8,068,428 B2  
APPLICATION NO. : 11/269931  
DATED : November 29, 2011  
INVENTOR(S) : Strutt et al.

Page 1 of 1

It is certified that error appears in the above-identified patent and that said Letters Patent is hereby corrected as shown below:

IN THE CLAIMS:

In Column 15, Line 37, in Claim 13, delete "least" and insert -- at least --, therefor.

Signed and Sealed this
Eighteenth Day of December, 2012

David J. Kappos
*Director of the United States Patent and Trademark Office*